United States Patent [19]

Delzenne

[11] Patent Number: 4,924,060
[45] Date of Patent: May 8, 1990

[54] CAP FOR AN ARC TORCH AND TORCH PROVIDED WITH SAID CAP

[75] Inventor: Michel Delzenne, Franconville, France

[73] Assignee: L'air Liquide, Societe Anonyme Pour L'etude et L'exploitation des Procedes Georges Claude, Paris, France

[21] Appl. No.: 363,405

[22] Filed: Jun. 2, 1989

Related U.S. Application Data

[63] Continuation of Ser. No. 142,664, Jan. 11, 1988, abandoned.

[30] Foreign Application Priority Data

Jan. 13, 1987 [FR] France .............................. 87 00256

[51] Int. Cl.$^5$ .............................................. B23K 9/00
[52] U.S. Cl. .................. 219/121.48; 219/75; 219/121.49; 219/121.5
[58] Field of Search .................. 219/121.36, 121.48, 219/121.49, 121.5, 121.51, 121.52; 313/231.31, 231.41, 231.51

[56] References Cited

U.S. PATENT DOCUMENTS

| | | | |
|---|---|---|---|
| 4,382,170 | 5/1983 | Klingel | 219/121 PP |
| 4,579,282 | 4/1986 | Navara et al. | 219/121 PP |
| 4,585,921 | 4/1986 | Wilkins et al. | 219/121 PT |
| 4,625,094 | 11/1986 | Marhic et al. | 219/121 PQ |
| 4,682,005 | 7/1987 | Marhic | 219/121 PP |

FOREIGN PATENT DOCUMENTS

| | | |
|---|---|---|
| 2379224 | 8/1978 | France . |
| 2534106 | 4/1984 | France . |
| 2534107 | 4/1984 | France . |

Primary Examiner—M. H. Paschall
Attorney, Agent, or Firm—Young & Thompson

[57] ABSTRACT

A cap for an arc torch comprises a skirt (10) composed of plastics material having a generally annular shape and surrounding and spaced from the nose (2, 7) of the torch, and a tubular nose-piece (12) composed of refractory material fitted in the free end of the skirt. The arc torch can be applied to plasma-arc cutting torches.

12 Claims, 1 Drawing Sheet

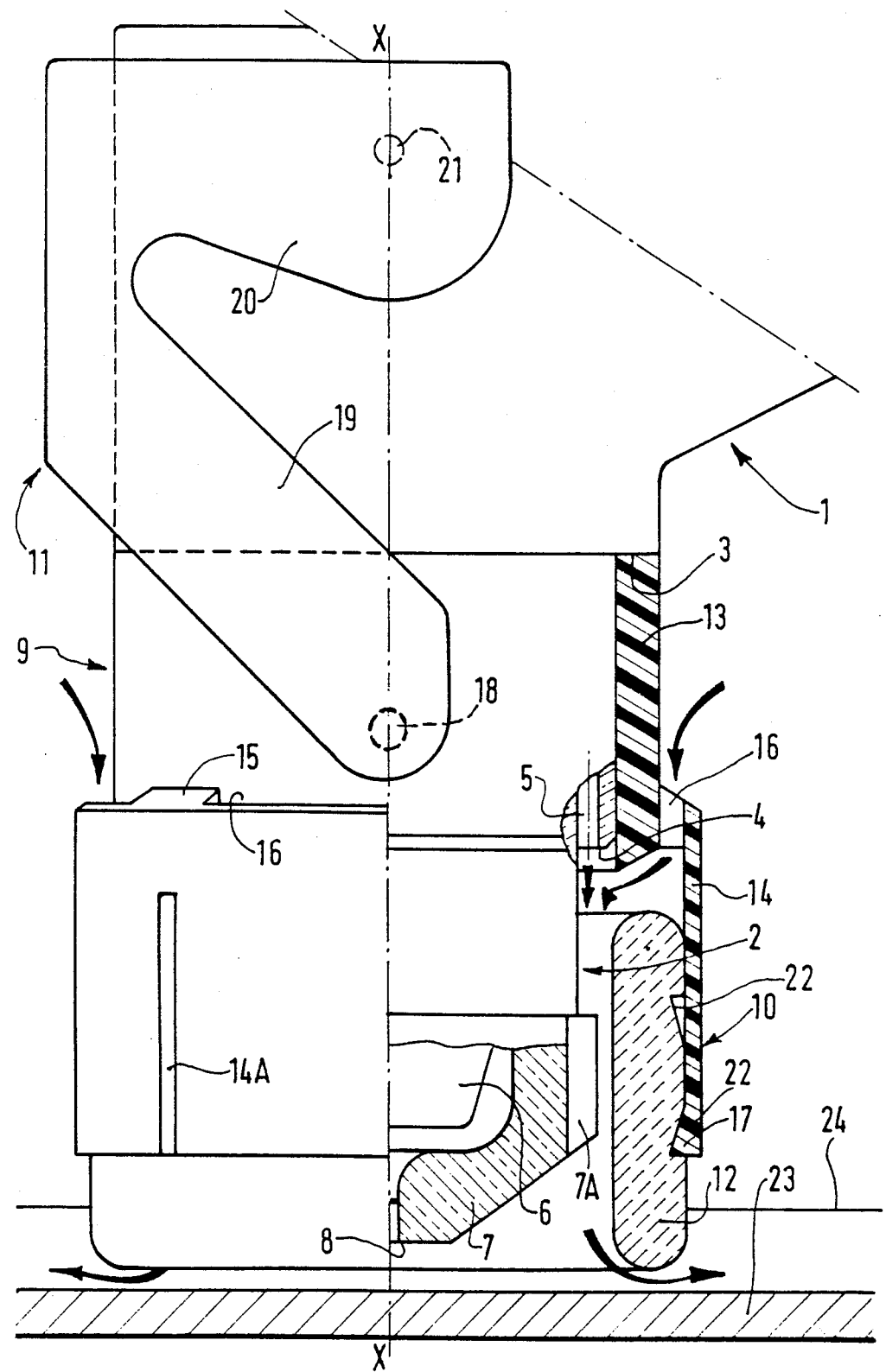

CAP FOR AN ARC TORCH AND TORCH PROVIDED WITH SAID CAP

This application is a continuation of application Ser. No. 07/142,664, filed 1/11/88, now abandoned.

FIELD OF THE INVENTION

The present invention relates to a cap for an arc welding or cutting torch of the type comprising a skirt having a generally annular shape which surrounds and is spaced from the nose of the torch.

BACKGROUND OF THE INVENTION

Some arc torches, for example the manual plasma-arc cutting torch sold by the firm La Soudure Autogene Francaise under the trademark Nertajet Zip, are equipped with a cap of this type. The skirt, which conducts around the plasma ejection nozzle a stream of compressed cooling air, is composed of a thermoplastic material so that it is possible to give it a relatively complex shape by injection moulding and obtain a good strength.

OBJECT OF THE INVENTION

An object of the present invention is to still further improve this cap and in particular prolong its life without affecting its mechanical properties. Indeed, the cap is subjected to the radiation of the arc, the thermal radiation of the nozzle and the projections of molten metal.

BRIEF SUMMARY OF THE INVENTION

The invention therefore provides a cap of the aformentioned type which comprises a tubular nose-piece composed of a refractory material fitted into the free end of the skirt.

Preferably, the nose-piece projects beyond the nose of the torch. The nose-piece, owing to its shape of revolution, then constitutes a guiding element capable of following any cutting or welding template.

In the application of the invention to plasma-arc cutting torches cooled with a gaseous stream, it is advantageous to arrange that the skirt include ports for the aspiration of ambient air. The high rate of flow of cooling gas thus created indeed forms a gaseous cushion which has a very favourable effect on the seating and the sliding of the torch during the cut.

The invention also provides an arc torch equipped with a cap such as defined hereinbefore.

BRIEF DESCRIPTION OF THE DRAWING

An embodiment of the invention will now be described with reference to the accompanying drawing in which the single FIGURE is an outer elevational view in its left half and an axial sectional view in its right half, of a torch nose provided with a cap according to the invention.

DETAILED DESCRIPTION OF THE INVENTION

There has been partly shown in the drawing the body 1 of a plasma-arc cutting torch in which a single stream of compressed air is divided, within the body 1, into a plasma gas creating stream and cooling gas stream. The outer part of the body 1 forms a nose 2 which has an axis X—X assumed to be vertical and forms at its upper end a first shoulder 3 and, roughly midway along its length, a second shoulder 4, and is screw threaded at its lower free end. A series of passageways 5 parallel to the axis X—X provide an outlet for the cooling gas and open through the intermediate shoulder 4. An electrode 6 is mounted in the nose 2 of the torch body.

A cup-shaped nozzle 7 having an axial orifice 8 for the outlet of the plasma jet and longitudinal fins 7A on its outer peripheral surface, is screw-threadedly engaged on the lower end of the nose 2 and surrounds the electrode 6 in spaced relation to the latter. The assembly comprising the nose 2 and the nozzle 7 constitutes the nose of the torch.

The internal structure of the torch body is disclosed in detail in the French Pat. No. 2,534,106. With a single supply of compressed air it ensures the division of this gas, in a substantially cnstant ratio of flow rates, into a plasma creating air stream which issues from the orifice 8 and a cooling air stream which issues from the passageways 5.

For the purpose of guiding the cooling air around the nose of the torch and thus ensuring a good cooling of the nozzle and a guiding of the torch under good conditions during the cutting operations, the nose of the torch is provided with a detachable cap 9 formed by three members, namely a skirt 10 of thermoplastic material, a pivotal jacket or yoke 11 also of thermoplastic material, and a nose-piece 12 of refractory and in particular ceramic, material.

The skirt 10 comprises an annular upper portion 13 which fits with a slight clearance on the upper portion of the nose 2 in abutting relation to the upper shoulder 3. In this position, the lower end of this portion 13 is substantially at the level of the intermediate shoulder 4. The skirt also includes a lower portion 14 of generally annular shape, the upper end of which surrounds with a marked clearance the lower end of the upper portion 13. Radial ribs 15 interconnect the portions 13 and 14 of the skirt so that passageways 16 are provided between the ribs 15. The lower portion 14 is split from its lower end along vertical slits 14A which are evenly spaced apart circumferentially so as to form a plurality of elastically yieldable claws. Moreover, this portion 14 has a constant thickness almost throughout its height, except in its lower end part which becomes progressively thicker in the downward and inward direction so as to form a trapezoidal shape constituting a bead 17.

The jacket 11 is identical to that disclosed in French Pat. No. 2,523,107. It is pivotally mounted at two diametrically opposed points of the portion 13 of the skirt by two lugs 18 provided at the ends of two branches of an oblique fork 19, the top of this fork being connected to the middle of a horizontal semi-cylinder 20. The ends of this semi-cylinder are clipped on two diametrically opposed projecting lugs 21 on the torch body and close an electric supply circuit of the torch, as described in detail in the last-mentioned French patent.

The nose-piece 12 is a section of a tube having rounded end portions and an inside diameter wihch is distinctly larger than the outside diameter of the nose of the torch, and an outside diameter roughly equal to the insider diameter of the lower portion 14 of the skirt 10. In the presently-described embodiment, the nose-piece is made from silicon nitride $Si_3N_4$.

Two annular grooves 22 which are symmetrical to each other and conjugate with the bead 17 are provided in the outer surface of the nose-piece. Thus, the nose-piece is placed in position by the fitting of the portion 14 of the skirt until the clipping of the bead 17 into the lower groove 22. As can be seen, the presence of the two grooves 22 enables the nose-piece to be placed in position in either of two directions. The nose-piece then completely surrounds the nozzle 7 and extends upwardly to within a short distance from the shoulder 4 of the torch body and it projects slightly beyond the free end surface of the nozzle. By offsetting the plane of symmetry of the two grooves 22 relative to the median plane of the nose-piece, two different heights of projection of the nose-piece relative to the nozzle are obtained. These two heights may correspond to two different arc lengths, for two different electric powers of the torch, in particular for manual cutting. As a modification, the projecting height may be nil, or even negative, in one of the two positions, in particular in the case of an automatic cutting torch.

In service, the torch is used for cutting a metal workpiece 23 along a line defined by a template 24 which is placed on this workpiece and has a height less than the distance by which the nose-piece 12 extends beyond the skirt 10. The cooling air, guided in the narrow passage defined between the torch nose and the nose-piece 12, creates by the venturi effect an aspiration of ambient air through the ports 16, which distinctly increases the rate of flow, for example on the order of 50%. This high rate of flow of air escapes between the nose-piece and the workpiece 23 and produces an air cushion effect which ensures the easy sliding of the torch along the workpiece 23 and affords a good seating to the torch. In this way, there are obtained a cut which is precisely perpendicular to the surface to be cut and a regular advance of the torch and consequently a cut of high quality.

Furthermore, the torch bears through the nose-piece 12 on the template 24 irrespective of the shape of the latter owing to the shape of revolution of the nose-piece. Note that the torch could also bear on the template by the skirt 10 with however perhaps less precision.

The nose-piece 12 also forms a thermal shield between the nozzle and the portion 14 of the skirt, i.e., between the hottest part of the torch and the facing part of the skirt. The latter is thus protected from deterioration of thermal origin. On the other hand, the skirt of thermoplastic material protects the ceramic nose-piece against shocks or blows.

The invention is also applicable to other types of arc torches, for example spot welding torches or automatic welding torches according to various TIG (Tungsten Inert Gas) or plasma processes, in which cases the gas guided by the cap is a weld protecting gas.

I claim:

1. A cap for fitting on an arc torch of the type comprising a torch body having an end portion, said end portion having an axis and comprising cooling gas conduit means and a nozzle having an arc outlet orifice substantially on said axis, said cap comprising in combination:
   a plastic skirt comprising means for securing the skirt to said body, said skirt having a free end portion;
   a tubular shield member made of refractory material and fitted in and supported by and extending beyond said free end portion of said skirt, whereby said plastic skirt protects the refractory shield member against shocks or blows;
   said shield member coaxially surrounding and being spaced from said nozzle when said skirt is secured to said torch body, whereby said shield member thermally protects said plastic skirt; and
   cooling gas passage means between said shield member and said nozzle, said cooling gas conduit means opening into said cooling gas passage means.

2. A cap according to claim 1, wherein said shield member and said skirt comprise cooperative interclipping reliefs.

3. A cap according to claim 1, wherein said shield member has a rounded free end portion.

4. A cap according to claim 1, wherein said shield member is invertible relative to said skirt to have two possible positions in said skirt.

5. A cap according to claim 4, wherein said shield member in said two positions projects different distances from said skirt.

6. A cap according to claim 1, wherein said shield member projects beyond said said end portion.

7. An arc torch comprising an end portion and a cap in combination with said end portion, said end portion having an axis, said end portion including a nozzle having an arc outlet orifice substantially on said axis, said cap comprising a plastic skirt mounted on said torch and having a free end portion, a tubular shield member composed of refractory material fitted in and supported by and extending beyond said free end portion of said skirt in surrounding and coaxial and spaced relation to said end portion, whereby said plastic skirt portects the refractory shield member against shocks or blows and said shield member thermally protects said plastic skirt; and cooling gas passage means between said shield member and said end portion.

8. A torch according to claim 7, wherein said shield member and said skirt comprises cooperative interclipping reliefs.

9. A torch according to claim 7, wherein said shield member has a rounded free end portion.

10. A torch according to claim 7, wherein said shield member is invertible relative to said skirt to have two possible positions in said skirt.

11. A torch according to claim 10, wherein said shield member in said two positions projects different distances from said skirt.

12. A torch according to claim 7, wherein said shield member projects beyond said end portion.

* * * * *